US006932546B2

(12) United States Patent
Ohlendorf

(10) Patent No.: US 6,932,546 B2
(45) Date of Patent: Aug. 23, 2005

(54) DRILL STAND FOR A PORTABLE CORE DRILL

(75) Inventor: Oliver Ohlendorf, Munich (DE)

(73) Assignee: Hilti Aktiengesellschaft, Schaan (LI)

(*) Notice: Subject to any disclaimer, the term of this patent is extended or adjusted under 35 U.S.C. 154(b) by 94 days.

(21) Appl. No.: 10/462,234

(22) Filed: Jun. 16, 2003

(65) Prior Publication Data

US 2004/0013484 A1 Jan. 22, 2004

(30) Foreign Application Priority Data

Jun. 17, 2002 (DE) ........................................ 102 26 866

(51) Int. Cl.$^{7}$ ................................................ B23B 47/00

(52) U.S. Cl. ........................................ 408/234; 408/110

(58) Field of Search ........................... 408/110–112, 76, 408/79, 97, 98, 72 R, 234; 175/220

(56) References Cited

U.S. PATENT DOCUMENTS 3,827,822 A * 8/1974 Converse .................... 408/110
4,684,303 A * 8/1987 Erdt et al. .................. 409/235
4,765,786 A * 8/1988 Krogh ........................ 408/110
5,006,022 A * 4/1991 Miller ......................... 408/16
5,150,993 A * 9/1992 Miller ........................ 408/110
5,348,428 A * 9/1994 Turner ......................... 408/99
5,794,724 A * 8/1998 Moller ....................... 175/170
5,899,644 A * 5/1999 Buck et al. .................... 408/97
6,059,703 A * 5/2000 Heisel et al. ................. 483/31
2004/0009045 A1 * 1/2004 Reichenberger et al. .... 408/238

FOREIGN PATENT DOCUMENTS

DE 3134563 A1 * 3/1983 ........... B32B/45/14
DE 9713139 1/1999
EP 0598218 5/1994
WO 9606714 3/1996

OTHER PUBLICATIONS

Search Report.

* cited by examiner

*Primary Examiner*—Derris H. Banks
*Assistant Examiner*—J Williams
(74) *Attorney, Agent, or Firm*—Abelman, Frayne & Schwab

(57) ABSTRACT

A drill stand for a portable core drill has a base plate (2) with an elongate opening (3) for securing the base plate (2) on a workpiece and with at least one reinforcing chamber (8*a*, 8*b*) that is closed along its edges extending parallel to the longitudinal axis (A) of the annular core bit of the core drill.

5 Claims, 2 Drawing Sheets

DRILL STAND FOR A PORTABLE CORE DRILL

BACKGROUND OF THE INVENTION

1. Field of the Invention

The present invention relates to a drill stand for a portable core drill.

2. Description of the Prior Art

High torques, displacement forces, and vibrations, which are generated during core drilling, should be absorbed by a base plate of a drill stand as flexural torques and transmitted to the drilled surface.

German Publication DE-3434261 discloses a drill stand for a portable core drill and having a base plate.

German patent DE-19731773C1 discloses a drill stand the base plate of which has an elongate opening for securing the base plate with a dowel bolt to the drilled surface, and two support blocks for securing the column for the core drill.

Usually, the light base plate is formed of cast metal, with its side facing the workpiece being provided with reinforcing ribs so that it contacts the workpiece only at the edges and surface unevenness is compensated. The high mechanical and dynamic loads can lead to fatigue and fracture of the base plate, which reduces the drill stand service life.

Accordingly, an object of the present invention is a drill stand for a portable core drill the base plate of which can absorb high bending torques and is fracture-resistant.

SUMMARY OF THE INVENTION

This and other objects of the present invention, which will become apparent hereinafter, are achieved by providing a drill stand, the base plate of which has at least one reinforcing chamber that is closed along its edges extending parallel to the axis of the annular core bit of the core drill, and has elements for securing the base plate to a workpiece and for securing the stand column.

The provision of one or more reinforcing chamber(s), which is (are) formed integrally with the base plate or is (are) screwed or glued thereto, insures a high bending resistance of the base plate that can be formed as a light, bending-resistant sandwich structure.

Advantageously, the reinforcing chamber has at least one side of it open and does not have any undercut, which makes possible its manufacture using a casting process, e.g., a pressure die-casting process.

Advantageously, the reinforcing chambers are open at both opposite sides of the base plate, and there are provided a plurality of mutually perpendicular reinforcing chambers.

Advantageously, the base plate is provided on its side facing the workpiece, with foot supports. This insures a stable positioning of the base plate on the workpiece and compensation of surface unevenness of the base plate.

Advantageously, the base plate has at least two mutually perpendicular reinforcing chambers, which insures a high resistance to transverse bending.

Advantageously, the base plate is formed of a light metal alloy, such as magnesium alloy, aluminum alloy which are light and compression-proof.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
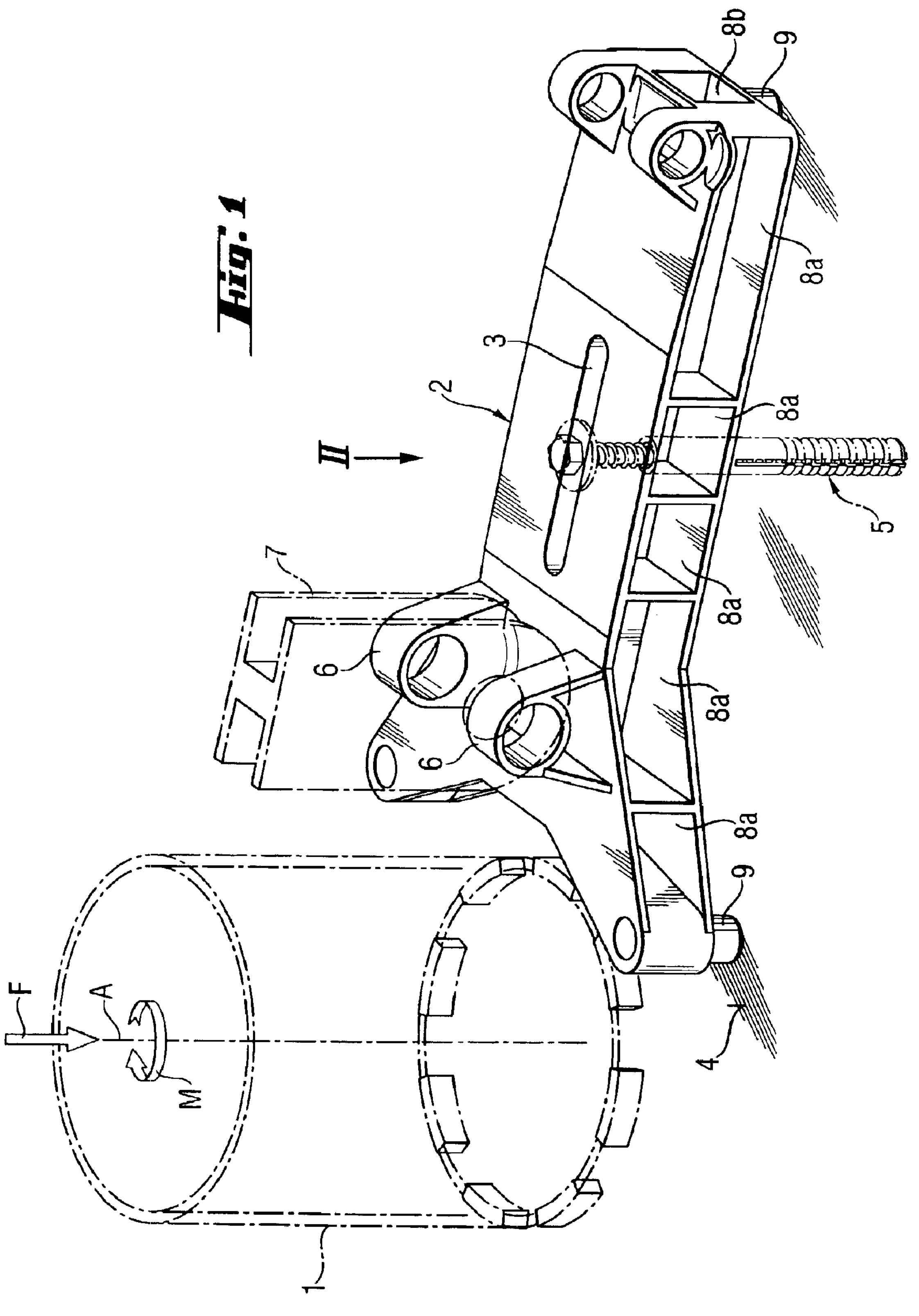
FIG. 1*a* perspective view of a base plate of a drill stand for a portable core drill.
Figure 2:
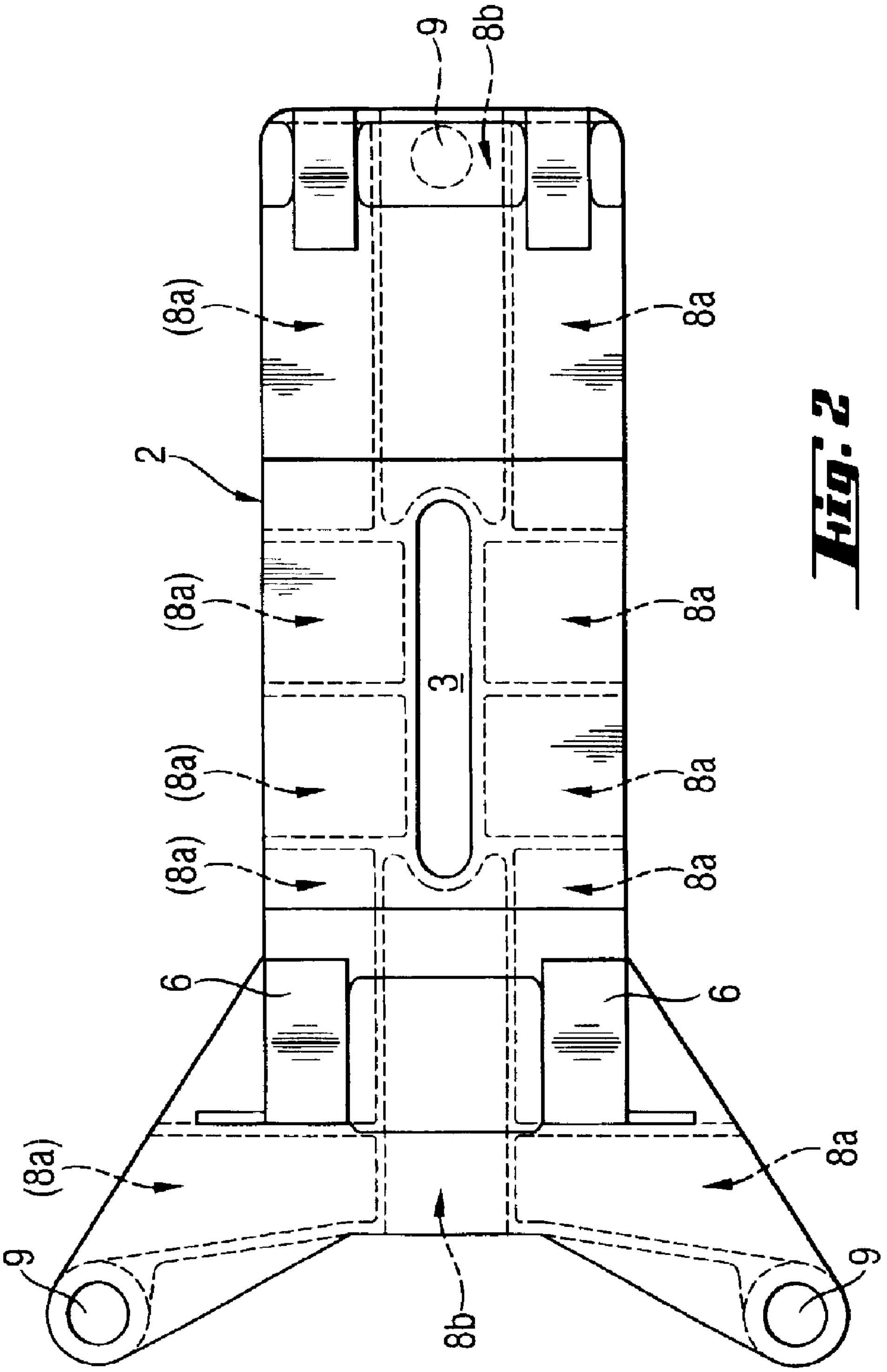
FIG. 2*a* plan view of the base plate shown in FIG. 1 in the direction of arrow II.

A drill stand according to the present invention for a portable core drill for driving an annular core bit 1 includes a one-piece base plate 2 formed of a magnesium alloy and having flat attachment means in the form of an elongate opening 3 for securing the base plate on a workpiece represented by a surface 4 with a dowel bolt 5, and column attachment means 6 in the form of two support blocks for securing a column 7. In the longitudinal direction of the drill axis A along which high displacement forces F and torques M act the base plate 2 has a plurality of reinforcing chambers 8*a* which are closed at their edges but have open opposite sides. The plate 2 further has a plurality of reinforcing chambers 8*b* arranged transverse to the reinforcing chambers 8*a*. On its side facing the workpiece, the base plate is provided with foot supports 9.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A drill stand for a portable core drill, comprising a base plate (2) having at least one reinforcing chamber (8*a*, 8*b*) that is closed along edges thereof extending parallel to a longitudinal axis (A) of an annular core bit (1); means (3) provided in the base plate (2) for securing the base plate (2) on a workpiece; and means (6) provided on the base plate (2) for securing a stand column (7) on the base plate (2), wherein the at least one reinforcing chamber (8*a*, 8*b*) is open at least on one of sides thereof.

2. A drill stand according to claim 1, wherein the at least one reinforcing chamber is open at both opposite sides thereof.

3. A drill stand according to claim 1, therein the base plate (2) has at least one another reinforcing chamber (8*a*, 8*b*) extending transverse to the at least one reinforcing chamber.

4. A drill stand according to claim 1, further comprising foot supports (9) provided on a side of the base plate (2) facing the workpiece.

5. A drill stand according to claim 1, wherein the base plate (2) is formed of a light metal alloy.

* * * * *